United States Patent
Matsumura et al.

(10) Patent No.: US 12,526,649 B2
(45) Date of Patent: Jan. 13, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 370 days.

(21) Appl. No.: 18/043,182

(22) PCT Filed: Aug. 28, 2020

(86) PCT No.: PCT/JP2020/032618
§ 371 (c)(1),
(2) Date: Feb. 27, 2023

(87) PCT Pub. No.: WO2022/044261
PCT Pub. Date: Mar. 3, 2022

(65) Prior Publication Data
US 2023/0328539 A1    Oct. 12, 2023

(51) Int. Cl.
*H04W 16/28*    (2009.01)
*H04B 7/06*    (2006.01)
*H04W 72/21*    (2023.01)

(52) U.S. Cl.
CPC ........ *H04W 16/28* (2013.01); *H04B 7/06968* (2023.05); *H04W 72/21* (2023.01)

(58) Field of Classification Search
CPC ... H04W 16/28; H04W 72/21; H04B 7/06968
See application file for complete search history.

(56) References Cited

U.S. PATENT DOCUMENTS

| | | | |
|---|---|---|---|
| 2020/0045700 A1* | 2/2020 | Sun | H04L 5/0091 |
| 2020/0337058 A1* | 10/2020 | Song | H04L 5/0053 |
| 2021/0135830 A1* | 5/2021 | Yu | H04B 7/06966 |
| 2023/0155753 A1* | 5/2023 | Zhou | H04L 5/0092 370/329 |
| 2023/0362665 A1* | 11/2023 | Xiao | H04L 5/0035 |

OTHER PUBLICATIONS

Office Action issued in Chinese Patent Application No. 202080106851.8, mailed on Aug. 8, 2024 (12 pages).

(Continued)

*Primary Examiner* — Michael Thier
*Assistant Examiner* — Tracy Lauren Raimondo
(74) *Attorney, Agent, or Firm* — Osha Bergman Watanabe & Burton LLP

(57) ABSTRACT

A terminal according to one aspect of the present disclosure includes a receiving section that receives a plurality of quasi-co-location (QCL) parameters with respect to a control resource set (CORESET), and a control section that uses, in a case where at least one of a physical uplink control channel (PUCCH) and the CORESET satisfies a condition, at least one of the plurality of QCL parameters, in at least one spatial relation of the PUCCH. The one aspect of the present disclosure enables appropriately determining information relating to QCL.

4 Claims, 13 Drawing Sheets

(56) References Cited

OTHER PUBLICATIONS

International Search Report issued in corresponding International Application No. PCT/JP2020/032618, mailed on Apr. 13, 2021 (3 pages).
Written Opinion issued in corresponding International Application No. PCT/JP2020/032618, mailed on Apr. 13, 2021 (3 pages).
vivo; "Discussion on MTRP multi-beam enhancement"; 3GPP TSG RAN WG1 #102-e, R1-2005366; e-Meeting; Aug. 17-28, 2020 (5 pages).
3GPP TS 36.300 V8.12.0; "3rd Generation Partnership Project; Technical Specification Group Radio Access Network; Evolved Universal Terrestrial Radio Access (E-UTRA); and Evolved Universal Terrestrial Radio Access Network (E-UTRAN); Overall description; Stage 2 (Release 8)"; Mar. 2010 (149 pages).

\* cited by examiner

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "6th generation mobile communication system (6G)," "New Radio (NR)," and "3GPP Rel. 15 or later versions") are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), a study is underway to allow a user terminal (terminal, user terminal, user equipment (UE)) to control transmission/reception processing based on information relating to quasi-co-location (QCL) (QCL assumption/transmission configuration indication (TCI) state/spatial relation).

However, the information relating to QCL may not be clear in some cases. The situation where the information relating to QCL is not clear may cause deterioration in communication quality and reduction in throughput.

Thus, an object of the present disclosure is to provide a terminal, a radio communication method, and a base station that appropriately determine information relating to QCL.

Solution to Problem

A terminal according to one aspect of the present disclosure includes a receiving section that receives a plurality of quasi-co-location (QCL) parameters with respect to a control resource set (CORESET), and a control section that uses, in a case where at least one of a physical uplink control channel (PUCCH) and the CORESET satisfies a condition, at least one of the plurality of QCL parameters, in at least one spatial relation of the PUCCH.

Advantageous Effects of Invention

The one aspect of the present disclosure enables appropriately determining information relating to QCL.

Figure 1:
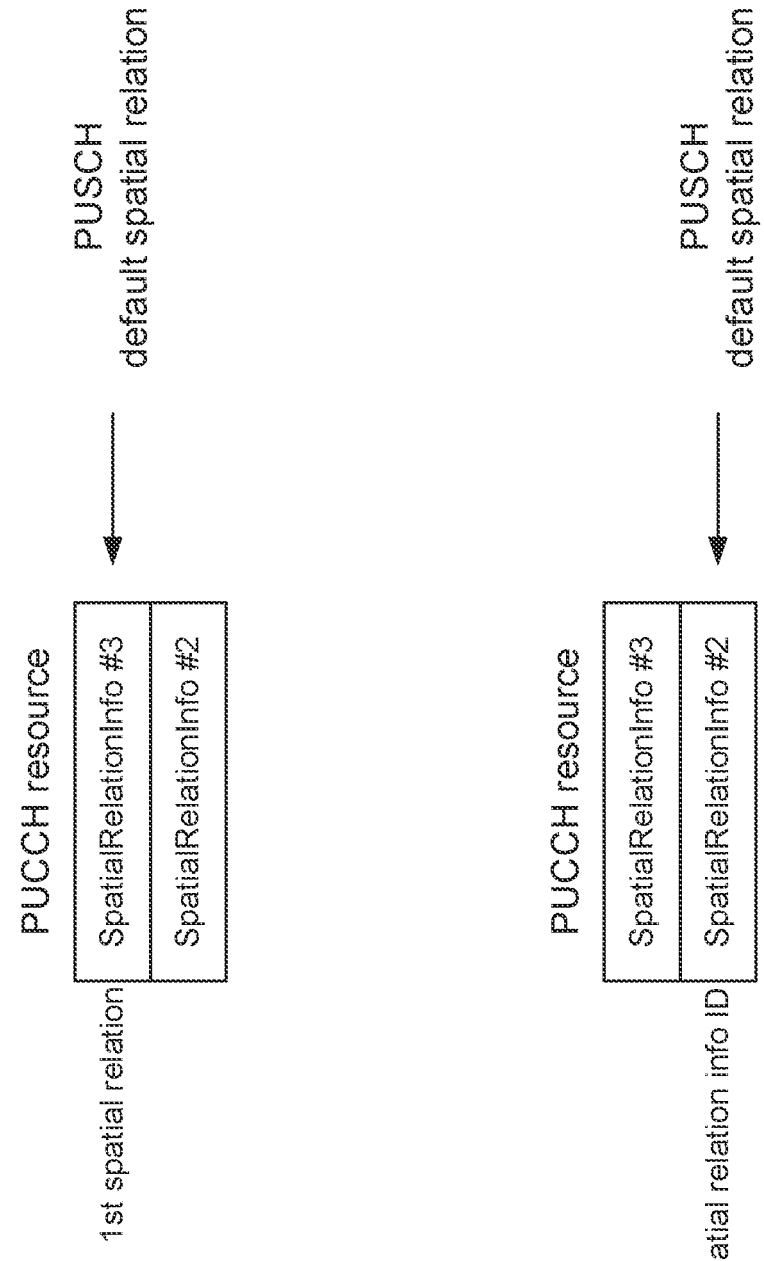
FIGS. 1A and 1B are diagrams to show examples of PUSCH default spatial relations according to Aspect 1-1.

DESCRIPTION OF EMBODIMENTS (TCI, Spatial Relation, QCL)

For NR, a study is underway to control, based on transmission configuration indication state (TCI state), reception processing (for example, at least one of reception, de-mapping, demodulation, and decoding) and transmission processing (for example, at least one of transmission, mapping, precoding, modulation, and coding) of at least one of a signal and a channel in a UE.

The TCI state may represent one that is used for a downlink signal/channel. One that corresponds to a TCI state used for an uplink signal/channel may be represented as a spatial relation.

The TCI state is information relating to quasi-co-location (QCL) of a signal/channel and may be referred to as a "spatial reception parameter," "spatial relation information," and so on. The TCI state may be configured to the UE with respect to each channel or each signal.

The QCL is an index showing a statistical property of a signal/channel. For example, a state where one signal/channel and another signal/channel are in a QCL relation may mean that at least one of Doppler shift, Doppler spread, average delay, delay spread, and spatial parameter (such as spatial reception parameter (spatial Rx parameter)) is the same (at least one of them is in QCL) between these different multiple signals/channels.

Note that the spatial reception parameter may correspond to a reception beam (such as a reception analog beam) of the UE, and a beam may be identified based on spatial QCL. The QCL (or at least one element of QCL) in the present disclosure may be interpreted as "sQCL (spatial QCL)."

Multiple types (QCL types) of QCL may be defined. For example, four QCL Types A to D having different parameters (or parameter sets) that can be supposed to be the same, may be provided, and the following describes these parameters (which may be referred to as "QCL parameters"):

QCL Type A (QCL-A): Doppler shift, Doppler spread, average delay, and delay spread, QCL Type B (QCL-B): Doppler shift and Doppler spread, QCL Type C (QCL-C): Doppler shift and average delay, and QCL Type D (QCL-D): spatial reception parameter.

The UE assumes one control resource set (CORESET), one channel, or one reference signal to be in a certain QCL (such as QCL Type D) relation with another CORESET, another channel, or another reference signal. This may be referred to as "QCL assumption."

The UE may determine, based on a TCI state or QCL assumption of a signal/channel, at least one of a transmission beam (Tx beam) and a reception beam (Rx beam) of the signal/channel.

The TCI state may be information relating to, for example, QCL between a target channel (in other words, a reference signal (RS) for the target channel) and another signal (such as another RS). The TCI state may be configured (indicated) by higher layer signaling, physical layer signaling, or a combination thereof.

The physical layer signaling may be, for example, downlink control information (DCI).

The channel to which a TCI state or a spatial relation is configured (indicated) may be, for example, at least one of a downlink shared channel (physical downlink shared channel (PDSCH)), a downlink control channel (physical downlink control channel (PDCCH)), an uplink shared channel (physical uplink shared channel (PUSCH)), and an uplink control channel (physical uplink control channel (PUCCH)).

The RS having a QCL relation with the channel may be, for example, at least one of a synchronization signal block (SSB), a channel state information reference signal (CSI-RS), a measurement reference signal (sounding reference signal (SRS)), a tracking CSI-RS (also referred to as a "tracking reference signal (TRS)"), and a QCL detection reference signal (also referred to as a "QRS").

The SSB is a signal block including at least one of a primary synchronization signal (PSS), a secondary synchronization signal (SSS), and a broadcast channel (physical broadcast channel (PBCH)). The SSB may be also referred to as an "SS/PBCH block."

An RS of QCL Type X of a TCI state may mean an RS having a QCL Type X relation with a (DMRS of) certain channel/signal, and this RS may be referred to as a "QCL source of QCL Type X of the TCI state."

(Pathloss RS)

Pathloss $PL_{b, f, c}(q_d)$ [dB] in transmission power control of each of a PUSCH, a PUCCH, and an SRS is calculated by the UE, with the use of an index $q_d$ of a downlink BWP reference signal (RS, pathloss reference RS) associated with an active UL BWP b of a carrier f of a serving cell c. In the present disclosure, the terms "pathloss reference RS," "pathloss (PL)-RS," "index $q_d$," "RS used for pathloss calculation," and "RS resource used for pathloss calculation" may be interchangeably interpreted. In the present disclosure, the terms "calculation," "estimation," "measurement," and "tracking" may be interchangeably interpreted.

It has been investigated whether to change an existing structure of higher layer filtered RSRP for measuring pathloss, in a case where the pathloss RS is updated by a MAC CE.

In the case where the pathloss RS is updated by a MAC CE, pathloss measurement based on L1-RSRP may be employed. Higher layer filtered RSRP may be used to measure pathloss, and L1-RSRP may be used to measure pathloss before the higher layer filtered RSRP is used, at an available time after the MAC CE for updating the pathloss RS. Higher layer filtered RSRP may be used to measure pathloss, and before this, higher layer filtered RSRP for a previous pathloss RS may be used, at an available time after the MAC CE for updating the pathloss RS. As in the case of operation in Rel. 15, higher layer filtered RSRP may be used to measure pathloss, and the UE may track every pathloss RS candidate configured by RRC. The maximum number of the pathloss RSs configurable by RRC may depend on UE capability. Supposing that the maximum number of the pathloss RSs configurable by RRC is X, X number or less of pathloss RS candidates may be configured by RRC, and a pathloss RS may be selected by a MAC CE from among the configured pathloss RS candidates. The maximum number of the pathloss RSs configurable by RRC may be 4, 8, 16, or 64.

In the present disclosure, the terms "higher layer filtered RSRP," "filtered RSRP," and "layer 3 filtered RSRP" may be interchangeably interpreted.

(Default TCI State/Default Spatial Relation/Default PL-RS)

In RRC connection mode, TCI information in DCI (higher layer parameter TCI-PresentInDCI) may be set to "Enabled," and TCI information in DCI may not be configured. In each situation, in the case where a time offset between reception of DL DCI (DCI for scheduling PDSCH) and the corresponding PDSCH (PDSCH scheduled by the DCI) is smaller than a threshold value (timeDurationForQCL) (application condition, first condition), and non-cross carrier scheduling is performed, a TCI state (default TCI state) of the PDSCH may be a TCI state of a lowest CORESET ID in a latest slot in an active DL BWP of the CC (of the certain UL signal). Otherwise, the TCI state (default TCI state) of the PDSCH may be a TCI state of a lowest TCI state ID of the PDSCH in an active DL BWP of a scheduled CC.

In Rel. 15, each of a MAC CE for activation/deactivation of a PUCCH spatial relation and a MAC CE for activation/deactivation of an SRS spatial relation is necessary. A PUSCH spatial relation follows the SRS spatial relation.

In Rel. 16, at least one of a MAC CE for activation/deactivation of a PUCCH spatial relation and a MAC CE for activation/deactivation of an SRS spatial relation may not be used.

In the case where both of a spatial relation and a PL-RS for a PUCCH are not configured in FR2 (application condition, second condition), default assumptions of a spatial relation and a PL-RS (default spatial relation and default PL-RS) are used in the PUCCH. In the case where both of a spatial relation and a PL-RS with respect to an SRS (SRS resource with respect to SRS, or SRS resource corresponding to SRI in DCI format 0_1 for scheduling a PUSCH) are not configured in FR2 (application condition, second condition), default assumptions of a spatial relation and a PL-RS (default spatial relation and default PL-RS) are used in the PUSCH and in the SRS that are scheduled by DCI format 0_1.

In the case where a CORESET is configured in the active DL BWP on the CC (application condition), the default spatial relation and the default PL-RS may be a TCI state or QCL assumption of the CORESET having a lowest CORESET ID of the active DL BWP. In the case where a CORESET is not configured in the active DL BWP on the CC, the default spatial relation and the default PL-RS may be an active TCI state having a lowest ID of the PDSCH of the active DL BWP.

In Rel. 15, a spatial relation of a PUSCH that is scheduled by DCI format 0_0 follows a spatial relation of a PUCCH resource having a lowest PUCCH resource ID, among active spatial relations of the PUCCH on the same CC. Networks need updating PUCCH spatial relations on all SCells although a PUCCH is not transmitted on the SCell.

In Rel. 16, PUCCH configuration for a PUSCH that is scheduled by DCI format 0_0 is not required. In the case where there is no active PUCCH spatial relation or PUCCH resource of an active UL BWP in a CC for the PUSCH that is scheduled by DCI format 0_0 (application condition, second condition), a default spatial relation and a default PL-RS are used in the PUSCH.

The application condition of the default spatial relation/default PL-RS for an SRS may include a condition in which a default beam pathloss enabling information element for the SRS (higher layer parameter enableDefaultBeamPlForSRS) is set to "Enabled." The application condition of the default spatial relation/default PL-RS for a PUCCH may include a condition in which a default beam pathloss enabling information element for the PUCCH (higher layer parameter enableDefaultBeamPlForPUCCH) is set to "Enabled." The application condition of the default spatial relation/default PL-RS for a PUSCH that is scheduled by DCI format 0_0 may include a condition in which a default beam pathloss enabling information element for the PUSCH that is scheduled by DCI format 0_0 (higher layer parameter enableDefaultBeamPlForPUSCH0_0) is set to "Enabled."

The threshold value may be referred to as a "time length (time duration) for QCL," a "timeDurationForQCL," a "threshold," a "threshold for offset between a DCI indicating a TCI state and a PDSCH scheduled by the DCI," a "threshold-sched-offset," a "schedule offset threshold value," a "scheduling offset threshold value," and so on.

(Multi TRP)

For NR, a study is underway to allow one or a plurality of transmission/reception points (TRPs) (multi TRPs (MTRPs)) to perform DL transmission to a UE by using one or a plurality of panels (multi panels). In addition, a study is also underway to allow a UE to perform UL transmission to one or a plurality of TRPs by using one or a plurality of panels.

Note that a plurality of TRPs may correspond to the same cell identifier (ID) or different cell IDs. The cell ID may be a physical cell ID or a virtual cell ID.

The multi TRPs (for example, TRPs #1 and #2) may be connected by an ideal/a non-ideal backhaul and may mutually transmit and receive information, data, and so on. The multi TRPs may transmit mutually different code words (CW) and mutually different layers. Multi-TRP transmission of one aspect may use non-coherent joint transmission (NCJT).

In NCJT, in one example, TRP #1 performs modulation mapping and layer mapping on a first code word and transmits a first number of layers (for example, two layers) on a first PDSCH by using first precoding. On the other hand, TRP #2 performs modulation mapping and layer mapping on a second code word and transmits a second number of layers (for example, two layers) on a second PDSCH by using second precoding.

Note that a plurality of PDSCHs (multiple PDSCHs) to be subjected to NCJT may be defined to be partially or completely overlap in at least one of a time domain or a frequency domain. That is, the first PDSCH from the first TRP and the second PDSCH from the second TRP may overlap in at least one of a time resource and a frequency resource.

These first PDSCH and second PDSCH may be assumed to be not in quasi-co-location (QCL) (not quasi-co-located). Reception of multiple PDSCHs may be interpreted as simultaneous reception of PDSCHs that are not of a certain QCL type (for example, QCL Type D).

A plurality of PDSCHs (may be referred to as multiple PDSCHs) from multi TRPs may be scheduled by using one DCI (single DCI, single PDCCH) (single master mode, single-DCI based multi-TRP). A plurality of PDSCHs from multi TRPs may be scheduled by using a plurality of DCI (multi DCI, multiple PDCCHs) (multi-master mode, multi-DCI based multi-TRP).

Such a multi-TRP scenario enables more flexible transmission control using a channel with a good quality.

In order to support multi-TRP transmission in a cell (intra-cell, having the same cell ID) and between cells (inter-cell, having different cell IDs) based on a plurality of PDCCHs, in RRC configuration information for linking a plurality of pairs of PDCCHs and PDSCHs having a plurality of TRPs, one control resource set (CORESET) in PDCCH configuration information (PDCCH-Config) may correspond to one TRP.

(Issues with PUSCH)

Functions for improving reliability and robustness have been studied with respect to channels (PDCCH, PUSCH, and PUCCH) other than a PDSCH, which uses at least one of multi TRPs and multi panels. For example, repetitions of a PDCCH, a PUCCH, and a PUSCH, using multi TRPs, have been investigated.

With respect to a PUSCH that is scheduled by DCI format 0_0 in one cell, a UE transmits the PUSCH in accordance with an applicable spatial relation that corresponds to an individual PUCCH resource having a lowest ID of an active UL BWP of the cell.

In this case, the PUSCH spatial relation follows a spatial relation of the PUCCH resource having the lowest ID.

With respect to the PUSCH that is scheduled by DCI format 0_0 in one cell, enabling parameters of a default beam and a default PL-RS for the PUSCH that is scheduled by DCI format 0_0 (higher layer parameter enableDefaultBeamPlForPUSCH 0_0) are set to "Enabled," a PUCCH resource of an active UL BWP is not configured to the UE, and the UE is in an RRC connected mode. In these conditions, in the case where one or more CORESETs are configured in the cell, the UE transmits the PUSCH in accordance with a spatial relation relating to an available RS that has "QCL Type D" corresponding to QCL assumption of a CORESET having a lowest ID of an active DL BWP of the cell.

With respect to the PUSCH that is scheduled by DCI format 0_0 in one cell, enabling parameters of a default beam and a default PL-RS for the PUSCH that is scheduled by DCI format 0_0 (higher layer parameter enableDefaultBeamPlForPUSCH 0_0) are set to "Enabled," a PUCCH resource of an active UL BWP is configured to the UE, no spatial relation is configured to every PUCCH resource, and the UE is in the RRC connected mode. In these conditions, the UE transmits the PUSCH in accordance with a spatial relation relating to an available RS that has "QCL Type D" corresponding to QCL assumption of a CORESET having a lowest ID of an active DL BWP of the cell.

In these cases, the PUSCH spatial relation follows QCL of the CORESET having the lowest ID.

The following issues 1 and 2 occur in the case where repetitions of a PDCCH, a PUCCH, and a PUSCH, using multi TRPs, are supported.

[Issue 1]

A study is underway to allocate a plurality of spatial relations to one PUCCH resource or a plurality of PUCCH resources for PUCCH repetition. In a case of using a PUCCH spatial relation as a default beam for a PUSCH, it is not clear how to define the default beam for the PUSCH, if a plurality of spatial relations are configured to/activated in/indicated to the reference PUCCH resource.

[Issue 2]

A study is also underway to allocate a plurality of TCI states to one CORESET/search space. In a case of using a TCI state of a CORESET as a default beam for a PUSCH, it is not clear how to define the default beam for the PUSCH, if a plurality of TCI states are configured to/activated in/indicated to the reference CORESET.

(Issue with PUCCH)

In the state where all of the following conditions 1 to 4 are satisfied, space setting for PUCCH transmission from the UE is the same as spatial setting for PDCCH reception that is performed by the UE, in a CORESET having a lowest ID of an active DL BWP of a PCell.

[Condition 1]

The UE is not provided with pathloss reference RSs in a PUCCH-power control parameter (PUCCH-PowerControl).

[Condition 2]

The UE is provided with enabling parameters of a default beam and a PL-RS for a PUCCH (enableDefaultBeamPlForPUCCH).

[Condition 3]

The UE is not provided with PUCCH-spatial relation information (PUCCH-SpatialRelationInfo).

[Condition 4]

A CORESET pool index value of "1" is not used even for one CORESET or is provided for every CORESET in a CORESET parameter (ControlResourceSet), and there is a TCI field in a DCI format of a search space set, in the UE, any code point of the TCI field is not mapped in two TCI states.

In this case, the PUCCH spatial relation follows QCL of the CORESET having the lowest ID.

The following issue occurs in the case where PUCCH repetition using multi TRPs is supported.

In a case of using a TCI state of a CORESET as a default beam for a PUCCH, it is not clear how to define the default beam for the PUCCH, if a plurality of TCI states are configured to/activated in/indicated to the reference CORESET.

(Issue with PDSCH)

In a case where a PDSCH is scheduled by a DCI format having no TCI field, a threshold value (timeDurationForQCL) is applicable, and the time offset between reception of the DL DCI and the corresponding PDSCH is a threshold value or greater, the UE assumes a TCI state or QCL assumption for the PDSCH to be the same as a TCI state or QCL assumption applied in a CORESET used for PDCCH transmission.

In this case, the PDCCH follows QCL of the CORESET for the PDCCH.

In the case where the (time) offset between reception of the DL DCI and the corresponding PDSCH is smaller than the threshold value (timeDurationForQCL), the UE assumes that a DM-RS port of a PDSCH of a serving cell is quasi-co-located with an RS relating to a QCL parameter used to indicate PDCCH QCL of a certain CORESET. The certain CORESET has a lowest CORESET ID (controlResourceSetId) of a latest slot in which one or more CORESETs in an active BWP of the serving cell are monitored by the UE, and the certain CORESET is associated with a search space that is monitored.

In this case, the QCL for the PDSCH follows QCL of the CORESET having the lowest ID of the latest slot.

Moreover, a study is also underway to allow the QCL for the PDSCH to follow QCL of a CORESET having a lowest ID.

The following issue occurs in the case where PDCCH repetition using multi TRPs is supported.

In a case of using a TCI state of a CORESET as a default beam for a PDSCH, it is not clear how to define the default beam for the PDSCH, if a plurality of TCI states are configured to/activated in/indicated to the reference CORESET.

In view of these issues, the inventors of the present invention came up with the idea of a method for determining a default beam.

In Rel. 16, a default spatial relation and a default PL-RS for an SRS/PUSCH (scheduled by DCI format 0_0, 0_1, or 0_2) have the same issues. The following each embodiment can be applied in the case where the default spatial relation/default PL-RS is used. Although a spatial relation with respect to a channel/RS for UL is mainly described in the following embodiments, the rule in each of the embodiments can be applied also to a default PL-RS.

Embodiments according to the present disclosure will be described in detail with reference to the drawings, hereinafter. The structures described in the embodiments may be employed independently or may be employed in combination.

In the present disclosure, the phrase "A/B" and the phrase "at least one of A and B" may be interchangeably interpreted. In the present disclosure, the terms "cell," "CC," "carrier," "BWP," "DL BWP," "UL BWP," "active DL BWP," "active UL BWP," and "band" may be interchangeably interpreted. In the present disclosure, the terms "index," "ID," "indicator," and "resource ID" may be interchangeably interpreted. In the present disclosure, the terms "supporting," "controlling," "controllable," "operating," and "operable" may be interchangeably interpreted.

In the present disclosure, the terms "configure," "activate," "update," "indicate," "enable," and "specify" may be interchangeably interpreted.

In the present disclosure, the terms "MAC CE" and "activation/deactivation command" may be interchangeably interpreted.

In the present disclosure, higher layer signaling may be any one or combinations of, for example, radio resource control (RRC) signaling, medium access control (MAC) signaling, and broadcast information. In the present disclosure, the terms "RRC parameter," "higher layer parameter," "RRC information element (IE)," and "RRC message" may be interchangeably interpreted.

For example, the MAC signaling may use MAC control elements (MAC CE), MAC Protocol Data Units (PDUs), and the like. The broadcast information may be, for example, master information blocks (MIBs), system information blocks (SIBs), minimum system information (remaining minimum system information (RMSI)), and other system information (OSI).

In the present disclosure, the terms "beam," "spatial domain filter," "spatial setting," "TCI state," "UL TCI state," "unified TCI state," "QCL assumption," "QCL parameter," "spatial domain reception filter," "UE spatial domain reception filter," "UE reception beam," "DL beam," "DL reception beam," "DL precoding," "DL precoder," "DL-RS," "RS of QCL Type D of TCI state/QCL assumption," "RS of QCL Type A of TCI state/QCL assumption," "spatial relation," "spatial domain transmission filter," "UE spatial domain transmission filter," "UE transmission beam," "UL beam," "UL transmission beam," "UL precoding," "UL precoder," and "PL-RS" may be interchangeably interpreted. In the present disclosure, the terms "QCL Type X-RS," "DL-RS associated with QCL Type X," "DL-RS having QCL Type X," "source of DL-RS," "SSB," "CSI-RS," and "SRS" may be interchangeably interpreted.

In the present disclosure, the terms "panel," "uplink (UL) transmission entity," "TRP," "spatial relation," "control resource set (CORESET)," "PDSCH," "code word," "base station," "antenna port of a certain signal (such as "demodulation reference signal (DMRS) port"), "antenna port group of a certain signal (such as DMRS port group)," "group for multiplexing (such as "code division multiplexing (CDM) group," "reference signal group," and "CORESET group"), "CORESET pool," "CW," "redundancy version (RV)," and "layer (MIMO layer, transmission layer, and spatial layer)" may be interchangeably interpreted. In addition, the terms "panel identifier (ID)" and "panel" may be interchangeably interpreted. In the present disclosure, the terms "TRP ID" and "TRP" may be interchangeably interpreted.

In the present disclosure, the UE to which a plurality of TRPs are configured may judge at least one of a TRP corresponding to DCI, a PDSCH scheduled by DCI, a TRP corresponding to UL transmission (such as PUCCH, PUSCH, and SRS), and so on, based on at least one of the following elements.

Value of a certain field (such as a field for specifying a TRP, an antenna port field, and a PRI) included in DCI.
DMRS corresponding to a PDSCH/PUSCH that is scheduled (such as a sequence of the DMRS, a resource, a CDM group, a DMRS port, a DMRS port group, and an antenna port group).
DMRS corresponding to a PDCCH on which DCI is transmitted (such as a sequence of the DMRS, a resource, a CDM group, a DMRS port, and a DMRS port group).
CORESET that receives DCI (such as a CORESET pool ID of the CORESET, an ID of the CORESET, a scramble ID (which may be interpreted as a "sequence ID"), and a resource).
RS (RS related group and so on) used for a TCI state, QCL assumption, spatial relation information, and the like.

In the present disclosure, a single PDCCH (DCI) may be referred to as a "PDCCH (DCI) of a first scheduling type (for example, scheduling Type A (or Type 1)). In addition, multiple PDCCHs (DCI) may be referred to as "PDCCHs (DCI) of a second scheduling type (for example, scheduling Type B (or Type 2)).

In the present disclosure, it may be assumed that a single PDCCH is supported in the case where multi TRPs use an ideal backhaul. It may be assumed that multiple PDCCHs are supported in the case where multi TRPs use a non-ideal backhaul therebetween.

Note that the ideal backhaul may be referred to as "DMRS port group Type 1," "reference signal related group Type 1," "antenna port group Type 1," "CORESET pool Type 1," and so on. The non-ideal backhaul may be referred to as "DMRS port group Type 2," "reference signal related group Type 2," "antenna port group Type 2," "CORESET pool Type 2," and so on. The names are not limited thereto.

In the present disclosure, the terms "single TRP," "single TRP system," "single TRP transmission," and "single PDSCH" may be interchangeably interpreted. In the present disclosure, the terms "multi TRP," "multi-TRP system," "multi-TRP transmission," and "multiple PDSCHs" may be interchangeably interpreted. In the present disclosure, the terms "single DCI," "single PDCCH," and "single-DCI based multi-TRP," and the phrase "activating two TCI states of at least one TCI code point" may be interchangeably interpreted.

In the present disclosure, the terms "single TRP," "channel using a single TRP," and "channel using one TCI state/spatial relation," and the phrases "not enabling multi TRPs by RRC/DCI," "not enabling a plurality of TCI states/spatial relations by RRC/DCI," and "not configuring a CORESET pool index value of "1" to any CORESET and not mapping each code point of a TCI field to two TCI states" may be interchangeably interpreted.

In the present disclosure, the terms "multi TRP," "channel using multi TRP," and "channel using a plurality of TCI states/spatial relations," and the phrases "enabling multi TRPs by RRC/DCI," "enabling a plurality of TCI states/spatial relations by RRC/DCI," and "at least one of a single-DCI based multi-TRP and a multi-DCI based multi-TRP" may be interchangeably interpreted. In the present disclosure, the term "multi-DCI based multi-TRP" and the phrase "configuring a CORESET pool index value of "1" to a CORESET" may be interchangeably interpreted. In the present disclosure, the term "single-DCI based multi-TRP" and the phrase "mapping at least one code point of a TCI field to two TCI states" may be interchangeably interpreted.

(Radio Communication Method)

In the present disclosure, the terms "reference PUCCH resource," "certain PUCCH resource," and "individual PUCCH resource having a lowest ID of an active UL BWP of the cell" may be interchangeably interpreted.

In the present disclosure, the terms "reference CORESET," "certain CORESET," "CORESET having a lowest ID of an active DL BWP of the cell," "CORESET used in PDCCH transmission," "CORESET having a lowest ID in a latest slot," and "CORESET having a lowest ID in a latest slot in which one or more CORESETs are monitored by a UE" may be interchangeably interpreted.

In the present disclosure, the terms "condition," "application condition," and "at least one application condition in First to Tenth Embodiments" may be interchangeably interpreted.

In the present disclosure, repetition may be applied to ultra-reliable and low-latency communications (URLLC). The URLLC may be a channel (PUSCH/PUCCH/PDSCH) that is scheduled by DCI including a priority indicator field showing priority index 0 or 1.

First Embodiment

In the case where PUCCH spatial relation information is used as a PUSCH default spatial relation, a plurality of spatial relations may be configured to/activated in/indicated to a reference PUCCH resource (PUCCH resource having the PUCCH spatial relation information). The PUSCH to which this default spatial relation is applied, may follow at least one of Aspects 1-1 and 1-2 described below.

<<Aspect 1-1>>

The PUSCH may be a single TRP PUSCH.

In the case where at least one of the following spatial relations 1 and 2 is applicable to the single TRP PUSCH, the UE may transmit a PUSCH in accordance with the spatial relation.

[Spatial Relation 1]

A first spatial relation that is configured to/activated in/indicated to an individual PUCCH resource (reference PUCCH resource) having a lowest ID of an active UL BWP of the cell. In the example in FIG. 1A, the UE uses a first spatial relation, for the default spatial relation/default PL-RS of the single TRP PUSCH, among a plurality of spatial relations of the reference PUCCH resource.

[Spatial Relation 2]

A spatial relation having a lowest spatial relation ID that is configured to/activated in/indicated to an individual PUCCH resource (reference PUCCH resource) having a lowest ID of an active UL BWP of the cell. In the example in FIG. 1B, the UE uses a spatial relation having a lowest spatial relation information ID, for the default spatial relation/default PL-RS of the single TRP PUSCH, among a plurality of spatial relations of the reference PUCCH resource.

In the case where at least one of the following application conditions 1 to 3 is satisfied, Aspect 1-1 may be applied.

[Application Condition 1]

A spatial relation of a PUCCH resource is used as the PUSCH default spatial relation. In one example, the PUSCH is scheduled by DCI format 0_0.

[Application Condition 2]

A plurality of spatial relations are configured to/activated in/indicated to the reference PUCCH resource.

[Application Condition 3]

The PUSCH is for single TRP PUSCH transmission.

<<Aspect 1-2>>

The PUSCH may be for multi-TRP PUSCH repetition.

The UE may perform the multi-TRP PUSCH repetition in accordance with at least one of the following procedures 1 and 2.

[Procedure 1]

The UE transmits a PUSCH in accordance with a plurality of spatial relations corresponding to an applicable plurality of spatial relations that are configured to/activated in/indicated to an individual PUCCH resource having a lowest ID of an active UL BWP of the cell. The mapping procedure between a plurality of default spatial relations and a plurality of PUSCH repetitions may be the same as a mapping procedure between a plurality of spatial relations and a plurality of PUSCH repetitions in the case where the plurality of spatial relations are configured/activated/indicated with respect to PUSCH transmission.

The UE may use a plurality of default spatial relations, in a plurality of repetitions.

Figure 2:
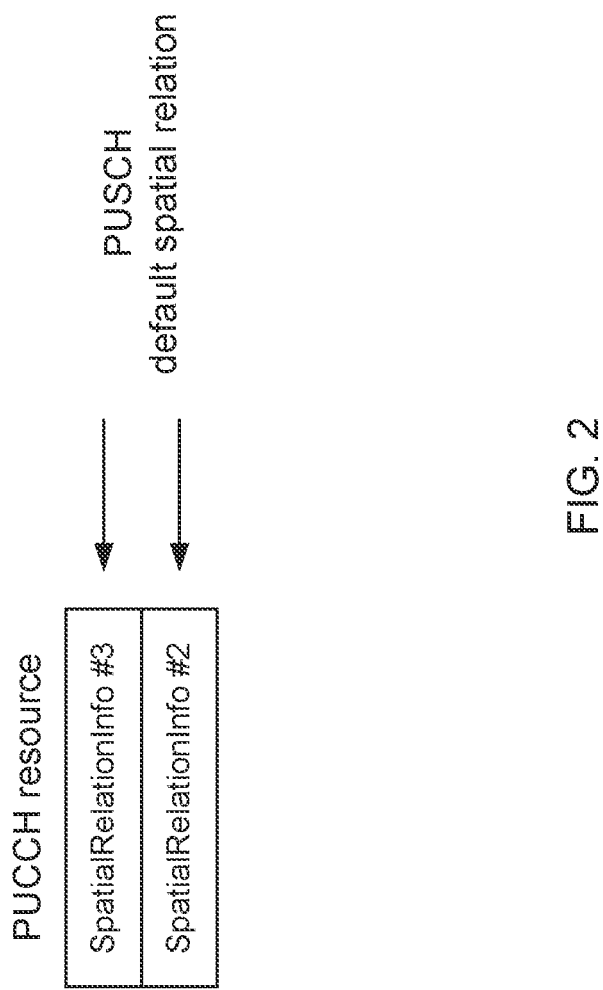
FIG. 2 is a diagram to show an example of the PUSCH default spatial relations according to Aspect 1-2.

In the example in FIG. 2, the UE uses two spatial relations of the reference PUCCH resource, for two default spatial relations/default PL-RSs of multi-TRP PUSCH repetition.

[Procedure 2]

The UE follows Aspect 1-1. The UE may fall back to PUSCH transmission having a single spatial relation. The UE may use one default spatial relation, in a plurality of repetitions.

In the case where at least one of the following application conditions 1 to 3 is satisfied, Aspect 1-2 may be applied.

[Application Condition 1]

A spatial relation of a PUCCH resource is used as the PUSCH default spatial relation. In one example, the PUSCH is scheduled by DCI format 0_0.

[Application Condition 2]

A plurality of spatial relations are configured to/activated in/indicated to the reference PUCCH resource.

[Application Condition 3]

The PUSCH is for multi-TRP PUSCH transmission.

Aspect 1-2 may be applied to at least one of single-DCI based multi-TRP PUSCH repetition and multi-DCI based multi-TRP PUSCH repetition.

First Embodiment enables appropriately using the PUCCH spatial relation information as the PUSCH default spatial relation.

Second Embodiment

In the case where QCL assumption of a CORESET is used as the PUSCH default spatial relation, a plurality of TCI states may be configured to/activated in/indicated to a reference CORESET (CORESET having the QCL assumption). The PUSCH to which this default spatial relation is applied, may follow at least one of Aspects 2-1 and 2-2 described below.

<<Aspect 2-1>>

The PUSCH may be a single TRP PUSCH.

In the case where a spatial relation relating to an RS having "QCL Type D" corresponding to QCL assumption of at least one of the following QCL assumptions 1 and 2, is applicable to the single TRP PUSCH, the UE may transmit a PUSCH in accordance with the spatial relation.

[QCL Assumption 1]

Figures 3A, 3B:
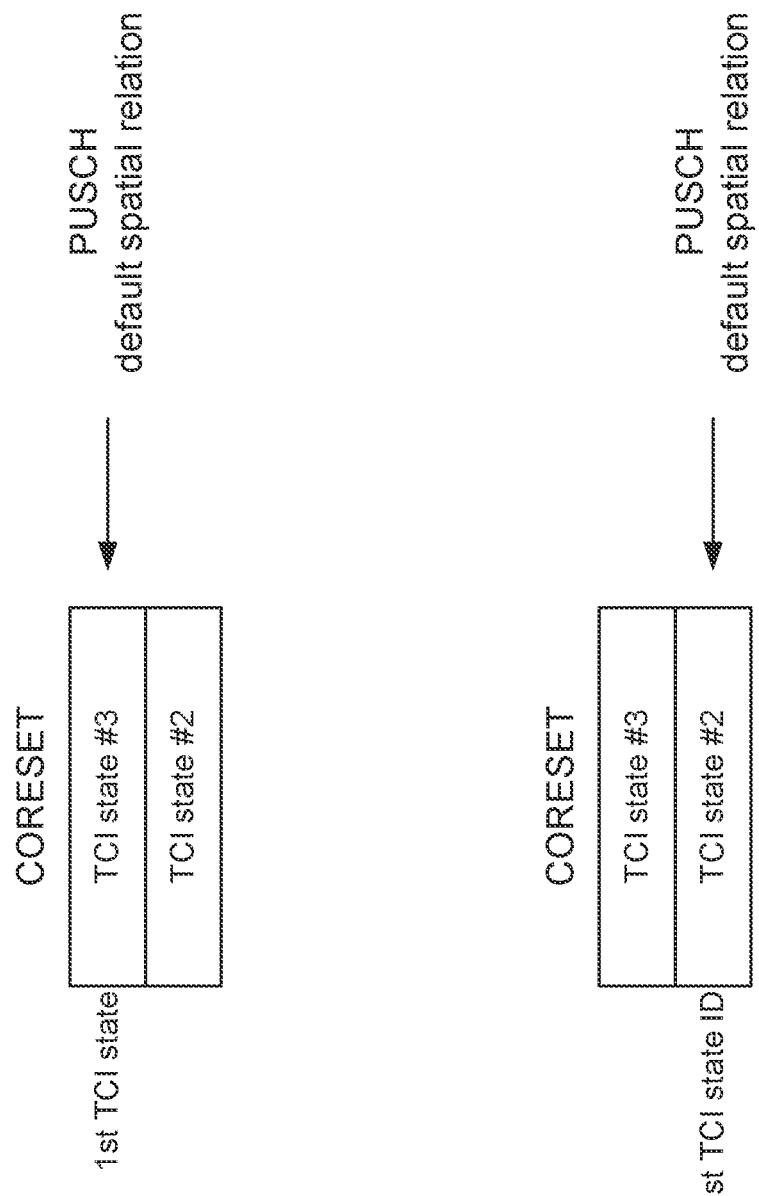
FIGS. 3A and 3B are diagrams to show examples of the PUSCH default spatial relations according to Aspect 2-1.

A first TCI state that is configured to/activated in/indicated to a CORESET (reference CORESET) having a lowest ID of an active DL BWP of the cell. In the example in FIG. 3A, the UE uses a first TCI state, for the default spatial relation/default PL-RS of the single TRP PUSCH, among a plurality of TCI states of the reference CORESET.

[QCL Assumption 2]

A TCI state having a lowest TCI state ID that is configured to/activated in/indicated to a CORESET (reference CORESET) having a lowest ID of an active DL BWP of the cell. In the example in FIG. 3B, the UE uses a TCI state having a lowest TCI state ID, for the default spatial relation/default PL-RS of the single TRP PUSCH, among a plurality of TCI states of the reference CORESET.

In the case where at least one of the following application conditions 1 to 3 is satisfied, Aspect 2-1 may be applied.

[Application Condition 1]

The QCL assumption of the CORESET is used as the PUSCH default spatial relation. In one example, the PUSCH is scheduled by DCI format 0_0, and the PUCCH resource is not configured. In another example, the PUSCH is scheduled by DCI format 0_0, and the spatial relation is not configured to the PUCCH resource.

[Application Condition 2]

A plurality of TCI states are configured to/activated in/indicated to the reference CORESET.

[Application Condition 3]

The PUSCH is for single TRP PUSCH transmission.

<<Aspect 2-2>>

The PUSCH may be for multi-TRP PUSCH repetition.

The UE may perform the multi-TRP PUSCH repetition in accordance with at least one of the following procedures 1 and 2.

[Procedure 1]

In the case where a plurality of spatial relations relating to an RS having "QCL Type D" corresponding to QCL assumption of a plurality of TCI states that are configured to/activated in/indicated to a CORESET having a lowest ID of an active DL BWP of the cell are applicable, the UE transmits a PUSCH in accordance with the plurality of the spatial relations. The mapping procedure between a plurality of default spatial relations and a plurality of PUSCH repetitions may be the same as a mapping procedure between a plurality of spatial relations and a plurality of PUSCH repetitions in the case where the plurality of spatial relations are configured/activated/indicated with respect to PUSCH transmission. The UE may use a plurality of default spatial relations, in a plurality of repetitions.

Figure 4:
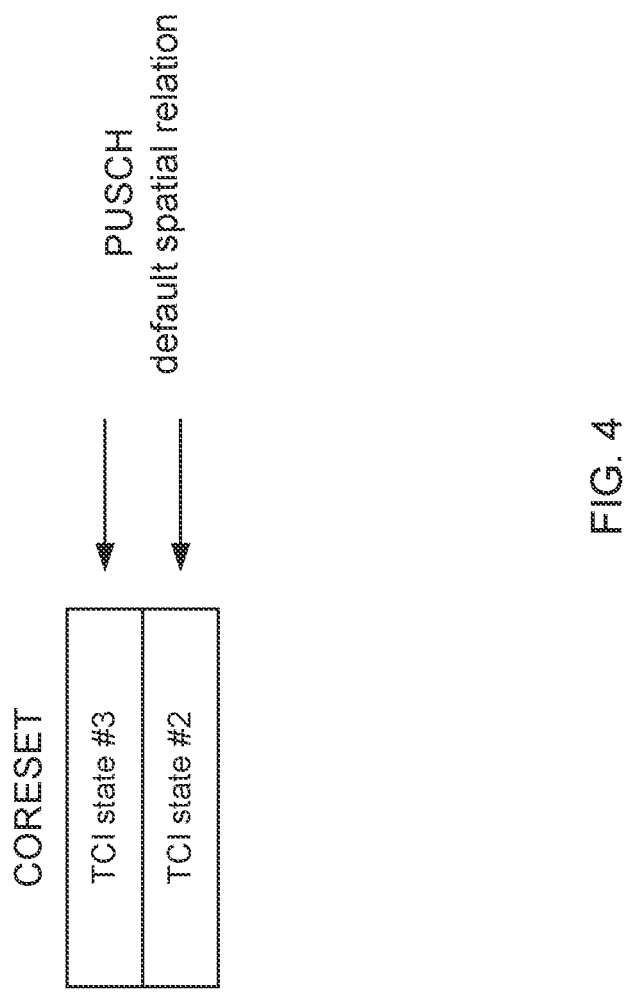
FIG. 4 is a diagram to show an example of the PUSCH default spatial relations according to Aspect 2-2.

In the example in FIG. 4, the UE uses two TCI states of the reference CORESET, for two default spatial relations/default PL-RSs of multi-TRP PUSCH repetition.

[Procedure 2]

The UE follows Aspect 2-1. The UE may fall back to PUSCH transmission having a single spatial relation. The UE may use one default spatial relation, in a plurality of repetitions.

In the case where at least one of the following application conditions 1 to 3 is satisfied, Aspect 2-2 may be applied.

[Application Condition 1]

The QCL assumption of the CORESET is used as the PUSCH default spatial relation. In one example, the PUSCH is scheduled by DCI format 0_0, and the PUCCH resource is not configured. In another example, the PUSCH is scheduled by DCI format 0_0, and the spatial relation is not configured to the PUCCH resource.

[Application Condition 2]

A plurality of TCI states are configured to/activated in/indicated to the reference CORESET.

[Application Condition 3]

The PUSCH is for multi-TRP PUSCH transmission.

Aspect 2-2 may be applied to at least one of single-DCI based multi-TRP PUSCH repetition and multi-DCI based multi-TRP PUSCH repetition.

Second Embodiment enables appropriately using the QCL assumption of the CORESET as the PUSCH default spatial relation.

Third Embodiment

A UE capability showing at least one of the following capabilities 1 to 4 relating to at least one of First and Second Embodiments may be defined.

[Capability 1]

Whether the UE supports one of a plurality of spatial relations of a PUCCH resource, which is used as the PUSCH default spatial relation (Aspect 1-1).

[Capability 2]

Whether the UE supports a plurality of spatial relations of a PUCCH resource, which are used as the plurality of PUSCH default spatial relations (Aspect 1-2).

[Capability 3]

Whether the UE supports one of a plurality of TCI states of a CORESET, which is used as the PUSCH default spatial relation (Aspect 2-1).

[Capability 4]

Whether the UE supports a plurality of TCI states of a CORESET, which are used as the plurality of PUSCH default spatial relations (Aspect 2-2).

In at least one of a case where the UE reports a corresponding UE capability and a case where a corresponding higher layer parameter is configured to/activated in/indicated to the UE, with respect to at least one function in First and Second Embodiments, the UE may use the function. Otherwise, the UE may not use the function.

Third Embodiment enables the UE to appropriately use the PUSCH default spatial relation while maintaining compatibility with existing specifications.

Fourth Embodiment

In the case where the QCL assumption of the CORESET is used as a PUCCH default spatial relation, a plurality of TCI states may be configured to/activated in/indicated to the reference CORESET (CORESET having the QCL assumption). The PUCCH to which this default spatial relation is applied, may follow at least one of Aspects 4-1 and 4-2 described below.

<<Aspect 4-1>>

The PUCCH may be a single TRP PUCCH.

With respect to a single TRP PUCCH, the UE may transmit a PUCCH by using the same spatial relation as a TCI state for PDCCH reception that follows at least one of TCI states 1 and 2 described below.

[TCI State 1]

Figures 5A, 5B:
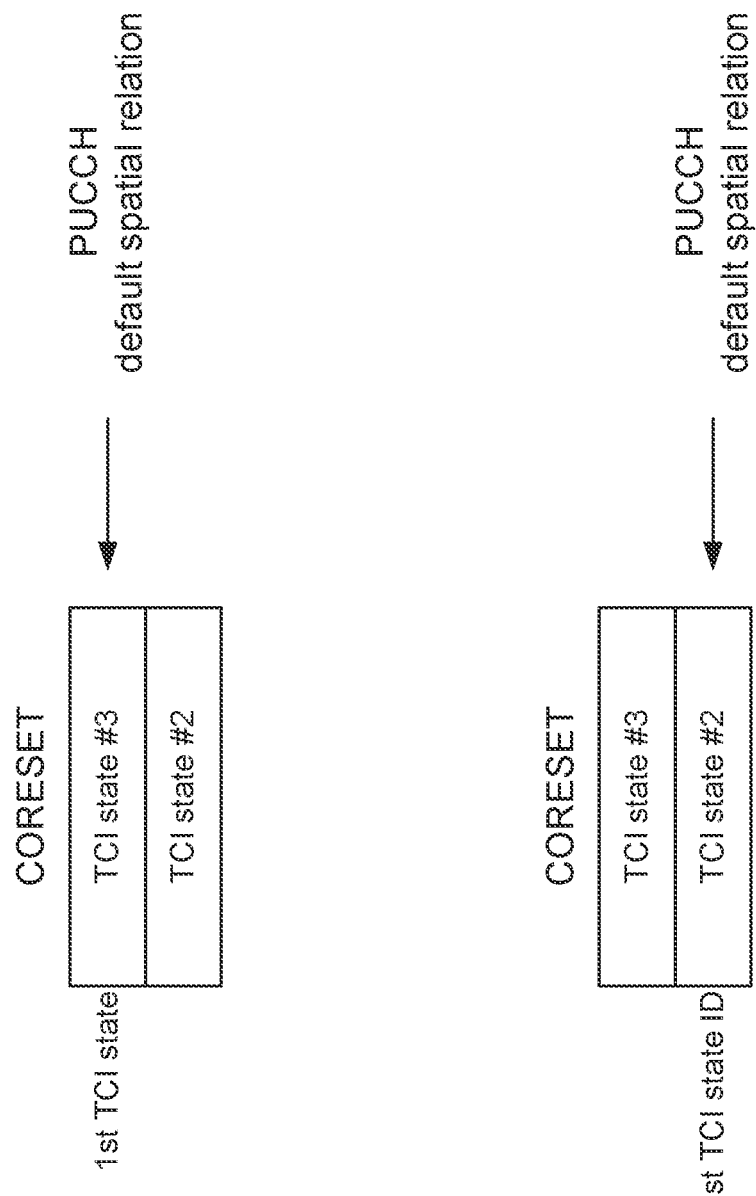
FIGS. 5A and 5B are diagrams to show examples of PUCCH default spatial relations according to Aspect 4-1.

A first TCI state that is configured to/activated in/indicated to a CORESET (reference CORESET) having a lowest ID of an active DL BWP of the cell. In the example in FIG. 5A, the UE uses a first TCI state, for the default spatial relation/default PL-RS of the single TRP PUCCH, among a plurality of TCI states of the reference CORESET.

[TCI State 2]

A TCI state having a lowest TCI state ID that is configured to/activated in/indicated to a CORESET (reference CORESET) having a lowest ID of an active DL BWP of the cell. In the example in FIG. 5B, the UE uses a TCI state having a lowest TCI state ID, for the default spatial relation/default PL-RS of the single TRP PUCCH, among a plurality of TCI states of the reference CORESET.

In the case where at least one of the following application conditions 1 to 3 is satisfied, Aspect 4-1 may be applied.

[Application Condition 1]

The QCL assumption of the CORESET is used as the PUCCH default spatial relation. For example, PUCCH spatial relation information (PUCCH-SpatialRelationInfo) is not configured to a PUCCH resource. For example, a PL-RS is not configured.

[Application Condition 2]

A plurality of TCI states are configured to/activated in/indicated to the reference CORESET.

[Application Condition 3]

The PUCCH is for single TRP PUCCH transmission.

<<Aspect 4-2>>

The PUCCH may be for multi-TRP PUCCH repetition.

The UE may perform the multi-TRP PUCCH repetition in accordance with at least one of the following procedures 1 and 2.

[Procedure 1]

A PUCCH is transmitted by using a plurality of spatial relations that are the same as a plurality of TCI states for PDCCH reception following a plurality of TCI states that are configured to/activated in/indicated to a CORESET having a lowest ID of an active DL BWP of the cell. The mapping procedure between a plurality of default spatial relations and a plurality of PUCCH repetitions may be the same as a mapping procedure between a plurality of spatial relations and a plurality of PUCCH repetitions in the case where the plurality of spatial relations are configured/activated/indicated with respect to the PUCCH transmission. The UE may use a plurality of default spatial relations, in a plurality of repetitions.

Figure 6:
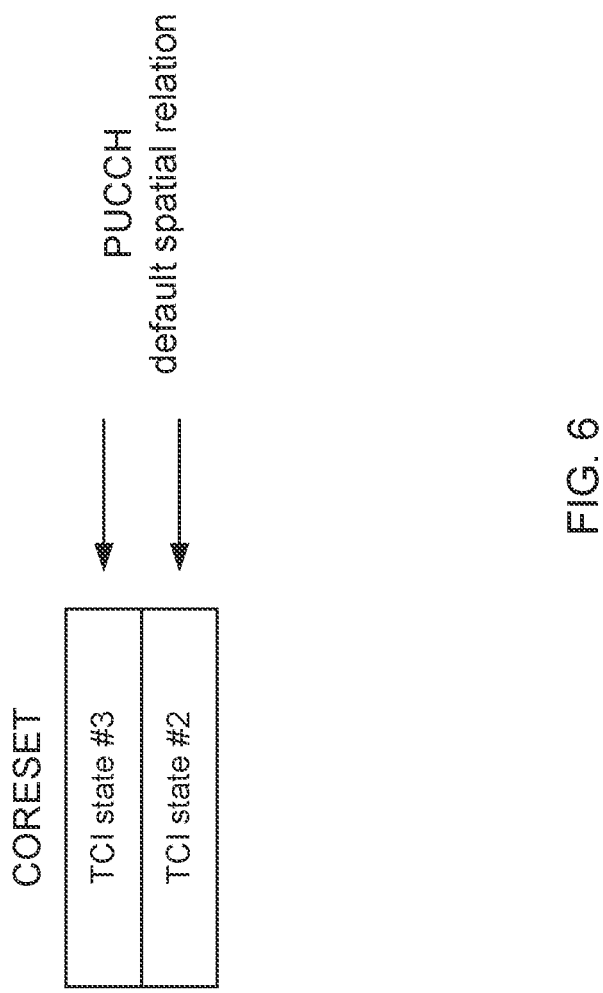
FIG. 6 is a diagram to show an example of the PUCCH default spatial relations according to Aspect 4-2.

In the example in FIG. 6, the UE uses two TCI states of the reference CORESET, for two default spatial relations/default PL-RSs of multi-TRP PUCCH repetition.
[Procedure 2]

The UE follows Aspect 4-1. The UE may fall back to PUCCH transmission having a single spatial relation. The UE may use one default spatial relation, in a plurality of repetitions.

In the case where at least one of the following application conditions 1 to 3 is satisfied, Aspect 4-2 may be applied.
[Application Condition 1]

The QCL assumption of the CORESET is used as the PUCCH default spatial relation. For example, PUCCH spatial relation information (PUCCH-SpatialRelationInfo) is not configured to a PUCCH resource. For example, a PL-RS is not configured.
[Application Condition 2]

A plurality of TCI states are configured to/activated in/indicated to the reference CORESET.
[Application Condition 3]

The PUCCH is for multi-TRP PUCCH transmission.

Fourth Embodiment enables appropriately using the QCL assumption of the CORESET as the PUCCH default spatial relation.

Fifth Embodiment

A UE capability showing at least one of the following capabilities 1 and 2 relating to at least one in Third Embodiment may be defined.
[Capability 1]

Whether the UE supports one of a plurality of TCI states of a CORESET, which is used as the PUCCH default spatial relation (Aspect 4-1).
[Capability 2]

Whether the UE supports a plurality of TCI states of a CORESET, which are used as the plurality of PUCCH default spatial relations (Aspect 4-2).

In at least one of a case where the UE reports a corresponding UE capability and a case where a corresponding higher layer parameter is configured to/activated in/indicated to the UE, with respect to at least one function in Fourth Embodiment, the UE may use the function. Otherwise, the UE may not use the function.

Fifth Embodiment enables the UE to appropriately use the PUCCH default spatial relation while maintaining compatibility with existing specifications.

Sixth Embodiment

In the case where the QCL assumption of the CORESET is used as PDSCH default QCL, a plurality of TCI states may be configured to/activated in/indicated to the reference CORESET (CORESET having the QCL assumption). The PDSCH to which this default QCL is applied, may follow at least one of Aspects 6-1 and 6-2 described below.
<<Aspect 6-1>>

The PDSCH may be a single TRP PDSCH.

In the case where the PDSCH of the single TRP PDSCH is scheduled by a DCI format having no TCI field, and the time offset between reception of the DL DCI and the corresponding PDSCH is a threshold value (timeDurationForQCL) or greater, the UE may assume a TCI state or QCL assumption for the PDSCH is the same as at least one of the following QCL parameters 1 and 2.
[QCL Parameter 1]

Figure 7A:
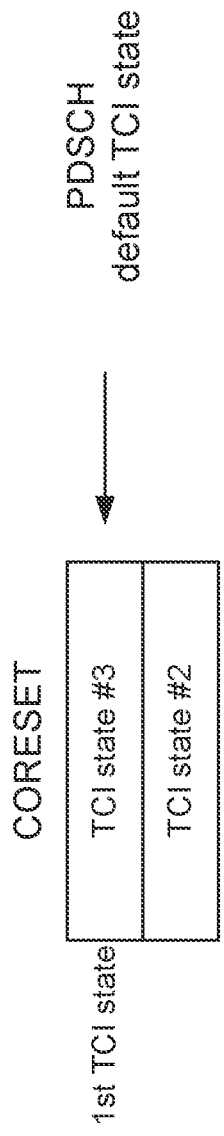
FIGS. 7A and 7B are diagrams to show examples of PDSCH default TCI states according to Aspect 6-1.

A first TCI state/QCL assumption that is configured to/activated in/indicated to a CORESET (reference CORESET) used in PDCCH transmission. In the example in FIG. 7A, the UE uses a first TCI state, for a default TCI state of the single TRP PDSCH, among a plurality of TCI states of the reference CORESET.
[QCL Parameter 2]

A TCI state/QCL assumption having a lowest TCI state ID that is configured to/activated in/indicated to a CORESET (reference CORESET) used in PDCCH transmission. In the example in FIG. 7B, the UE uses a TCI state having a lowest TCI state ID, for a default TCI state of the single TRP PDSCH, among a plurality of TCI states of the reference CORESET.

With respect to the single TRP PDSCH, in the case where the time offset between reception of the DL DCI and the corresponding PDSCH is smaller than a threshold value (timeDurationForQCL), the UE may assume a TCI state or QCL assumption for the PDSCH to be the same as at least one of the following QCL parameters 1 and 2 (may assume that a DM-RS port of a PDSCH of a serving cell is quasi-co-located with an RS relating to at least one of the following QCL Parameters 1 and 2).
[QCL Parameter 1]

A first TCI state/QCL assumption that is configured to/activated in/indicated to a CORESET (reference CORESET) having a lowest ID of an active DL BWP of the cell (FIG. 7A).
[QCL Parameter 2]

Figure 7B:
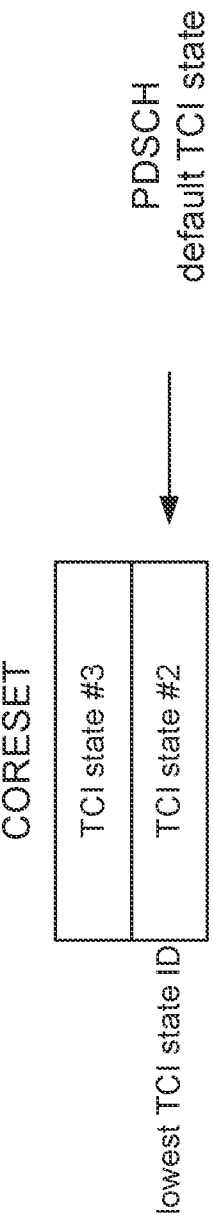

A TCI state/QCL assumption having a lowest TCI state ID that is configured to/activated in/indicated to a CORESET (reference CORESET) having a lowest ID of an active DL BWP of the cell (FIG. 7B).

In the case where at least one of the following application conditions 1 to 2 is satisfied, Aspect 6-1 may be applied.
[Application Condition 1]

A plurality of TCI states are configured to/activated in/indicated to the reference CORESET.
[Application Condition 2]

The PDSCH is for single TRP PDSCH transmission.
<<Aspect 6-2>>

The PDSCH may be for multi-TRP PDSCH repetition.

With respect to multi-TRP PDSCH repetition, in the case where the PDSCH is scheduled by a DCI format having no TCI field, and the time offset between reception of the DL DCI and the corresponding PDSCH is a threshold value (timeDurationForQCL) or greater, the UE may follow at least one of procedures 1 and 2 described below.
[Procedure 1]

The UE assumes a plurality of TCI states/QCL assumptions for the PDSCH to be the same as a plurality of TCI states/QCL assumptions that are configured to/activated in/indicated to a CORESET used in PDCCH reception. The mapping procedure between a plurality of default TCI states and a plurality of PDSCH repetitions may be the same as a mapping procedure between a plurality of TCI states and a plurality of PDSCH repetitions in the case where the plurality of TCI states are configured/activated/indicated with respect to PDSCH transmission. The UE may use a plurality of default TCI states, in a plurality of repetitions.

Figure 8:
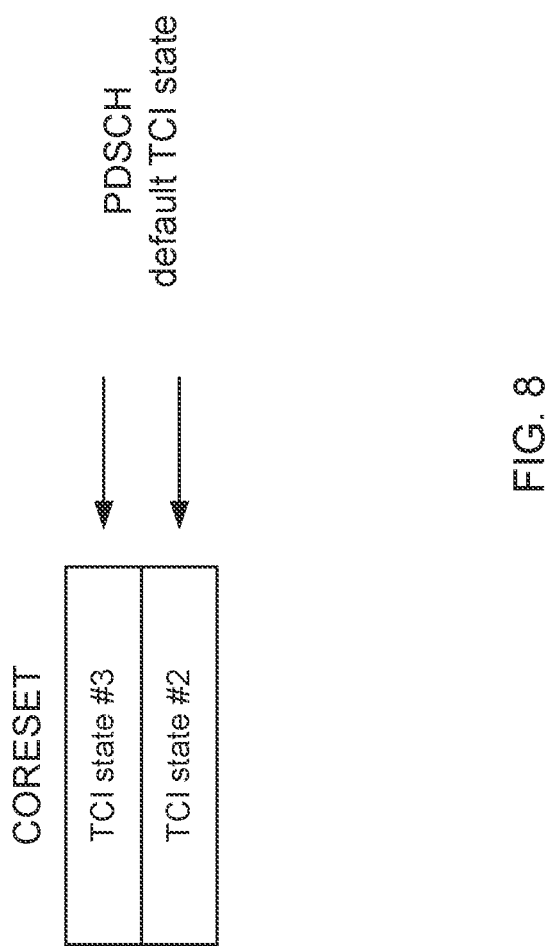
FIG. 8 is a diagram to show an example of the PDSCH default TCI states according to Aspect 6-2.

In the example in FIG. 8, the UE uses two TCI states of a reference CORESET, for two default TCI states of multi-TRP PDSCH repetition.
[Procedure 2]

The UE follows Aspect 6-1. The UE may fall back to PDSCH transmission having a single TCI state. The UE may use one default TCI state, in a plurality of repetitions.

With respect to the single TRP PDSCH, in the case where the time offset between reception of the DL DCI and the corresponding PDSCH is smaller than a threshold value (timeDurationForQCL), the UE may follow at least one of procedures 1 and 2 described below.

[Procedure 1]

The UE assumes a plurality of TCI states/QCL assumptions for the PDSCH to be the same as a plurality of TCI states/QCL assumptions that are configured to/activated in/indicated to a CORESET having a lowest ID of an active DL BWP of the cell. The mapping procedure between a plurality of default TCI states and a plurality of PDSCH repetitions may be the same as a mapping procedure between a plurality of TCI states and a plurality of PDSCH repetitions in the case where the plurality of TCI states are configured/activated/indicated with respect to PDSCH transmission. The UE may use a plurality of default TCI states, in a plurality of repetitions.

[Procedure 2]

The UE follows Aspect 6-1. The UE may fall back to PDSCH transmission having a single TCI state. The UE may use one default TCI state, in a plurality of repetitions.

In the case where at least one of the following application conditions 1 to 2 is satisfied, Aspect 6-2 may be applied.

[Application Condition 1]

A plurality of TCI states are configured to/activated in/indicated to the reference CORESET.

[Application Condition 2]

The PDSCH is for multi-TRP PDSCH transmission.

Sixth Embodiment enables appropriately using the QCL assumption of the CORESET as the PDSCH default spatial relation.

Seventh Embodiment

A UE capability showing at least one of the following capabilities 1 and 2 relating to at least one in Sixth Embodiment may be defined.

[Capability 1]

Whether the UE supports one of a plurality of TCI states of a CORESET, which is used as the PDSCH default TCI state (Aspect 6-1).

[Capability 2]

Whether the UE supports a plurality of TCI states of a CORESET, which are used as the plurality of PDSCH default TCI states (Aspect 6-2).

In at least one of a case where the UE reports a corresponding UE capability and a case where a corresponding higher layer parameter is configured to/activated in/indicated to the UE, with respect to at least one function in Sixth Embodiment, the UE may use the function. Otherwise, the UE may not use the function.

Seventh Embodiment enables the UE to appropriately use the PDSCH default spatial relation while maintaining compatibility with existing specifications.

Eighth Embodiment

In at least one of First to Seventh Embodiments, the UE may follow at least one of Aspects 8-1 and 8-2 described below.

<<Aspect 8-1>>

In at least one of First to Seventh Embodiments, in the case where the TCI state/QCL assumption of the CORESET is used as the default spatial relation/TCI state/QCL assumption of a PUSCH/PUCCH/PDSCH, the reference CORESET may be a certain CORESET. The certain CORESET may not be a CORESET having a lowest ID. The certain CORESET may be a CORESET having a lowest ID in a latest slot or may be a CORESET having a lowest ID in a latest slot in which one or more CORESETs are monitored by the UE.

<<Aspect 8-2>>

In First Embodiment, in the case where a spatial relation of a PUCCH resource is used as the PUSCH default spatial relation, the reference PUCCH resource may be a certain PUCCH resource. The certain PUCCH resource may not be an individual PUCCH resource having a lowest ID of an active UL BWP of the cell.

Eighth Embodiment enables appropriately determining the reference CORESET or the reference PUCCH resource.

Ninth Embodiment

In at least one of First to Seventh Embodiments, the UE may follow at least one of Aspects 9-1 and 9-2 described below.

<<Aspect 9-1>>

One default TCI state/spatial relation may be explicitly configured/activated/indicated. The UE may use the default TCI state/spatial relation that is configured/activated/indicated, in at least one of First to Seventh Embodiments.

<<Aspect 9-2>>

A plurality of default TCI states/spatial relations may be explicitly configured/activated/indicated. The UE may use the plurality of default TCI states/spatial relations that are configured/activated/indicated, in at least one of First to Seventh Embodiments.

The UE may apply at least one of the following parameters 1 and 2 to a single TRP.

[Parameter 1]

First default TCI state/spatial relation being configured/activated/indicated.

[Parameter 2]

Default TCI state/spatial relation having a lowest ID and being configured/activated/indicated.

The UE may apply a plurality of TCI states/spatial relations that are configured to/activated in/indicated, to a multi TRP. The mapping procedure between a plurality of default TCI states/spatial relations and a plurality of PDSCH/PUSCH/PUCCH repetitions may be the same as a mapping procedure between a plurality of TCI states/spatial relations and a plurality of PDSCH repetitions in the case where the plurality of TCI states/spatial relations are configured/activated/indicated with respect to the PDSCH/PUSCH/PUCCH. The UE may use a plurality of default TCI states/default spatial relations, in a plurality of repetitions.

In order to distinguish between operation in Ninth Embodiment and operation in at least one of First to Seventh Embodiments, an RRC parameter may be configured.

In the case where the default TCI state/spatial relation is not explicitly configured/activated/indicated, the UE may apply at least one of First to Seventh Embodiments.

Ninth Embodiment enables appropriately determining the plurality of default TCI states/spatial relations.

Tenth Embodiment

The number of TCI states/QCL assumptions/spatial relations of a target RS may be 1 at any time, irrespective of the number of TCI states/QCL assumptions/spatial relations of a source RS of the default spatial relation.

In the case where there are a plurality of TCI states/QCL assumptions that are assumed for a source of the default spatial relation, the default spatial relation/default PL-RS may be 1. For example, the UE may select a lowest TCI state ID. In one example, in the state where there are first and second TCI states that are configured/indicated, the UE may select the first TCI state.

Figure 9A:
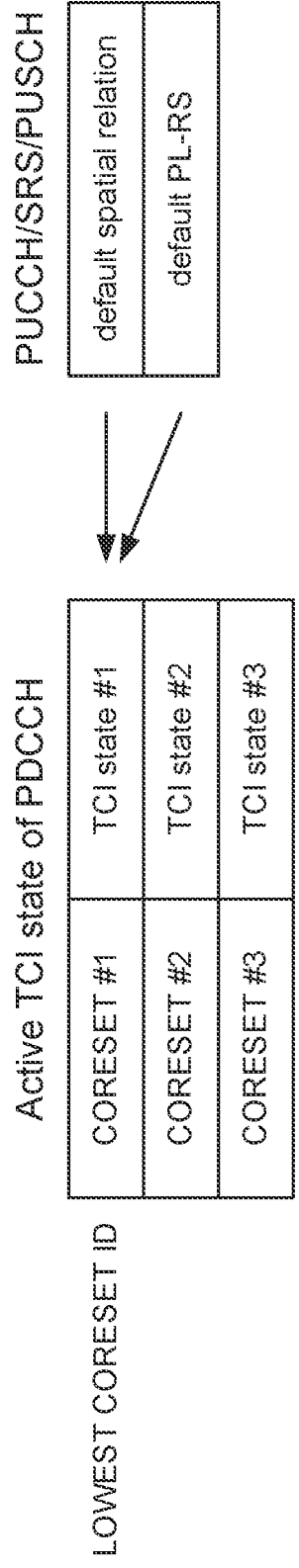
FIGS. 9A and 9B are diagrams to show examples of default spatial relations according to Tenth Embodiment.
Figure 9B:
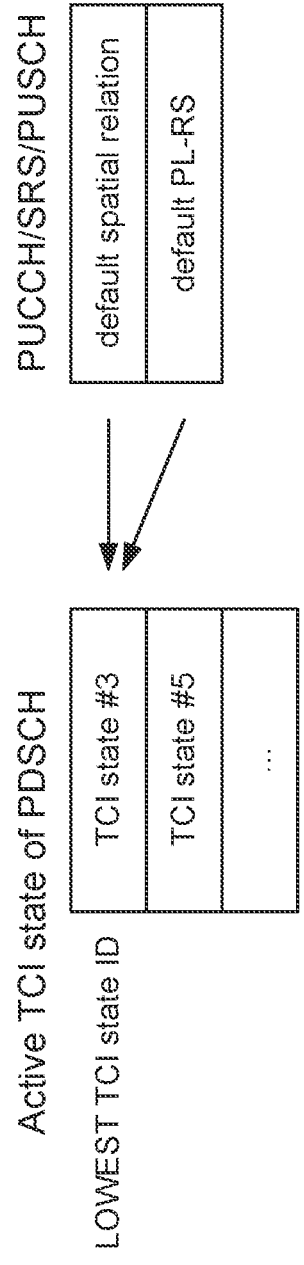

In the example in FIG. 9A, in the case where a CORESET is configured in a CC, the default spatial relation and the default PL-RS are a TCI state of a CORESET having a lowest CORESET ID, among a plurality of active TCI states of a PDCCH. In the example in FIG. 9B, in the case where a CORESET is not configured in a CC, the default spatial relation and the default PL-RS are a TCI state having a lowest TCI state ID, among a plurality of active TCI states of a PDSCH.

In the case where a spatial relation and a PL-RS of a PUCCH/SRS/PUSCH are not configured in FR2, the default spatial relation and the default PL-RS of the PUCCH/SRS/PUSCH may follow one TCI state/QCL assumption, even when there are a plurality of TCI states/QCL assumptions.

Tenth Embodiment enables appropriately determining the default spatial relation/default PL-RS.

(Radio Communication System)

Hereinafter, a structure of a radio communication system according to one embodiment of the present disclosure will be described. In this radio communication system, the radio communication methods according to the foregoing embodiments of the present disclosure may be used alone or may be used in combination for communication.

Figure 10:
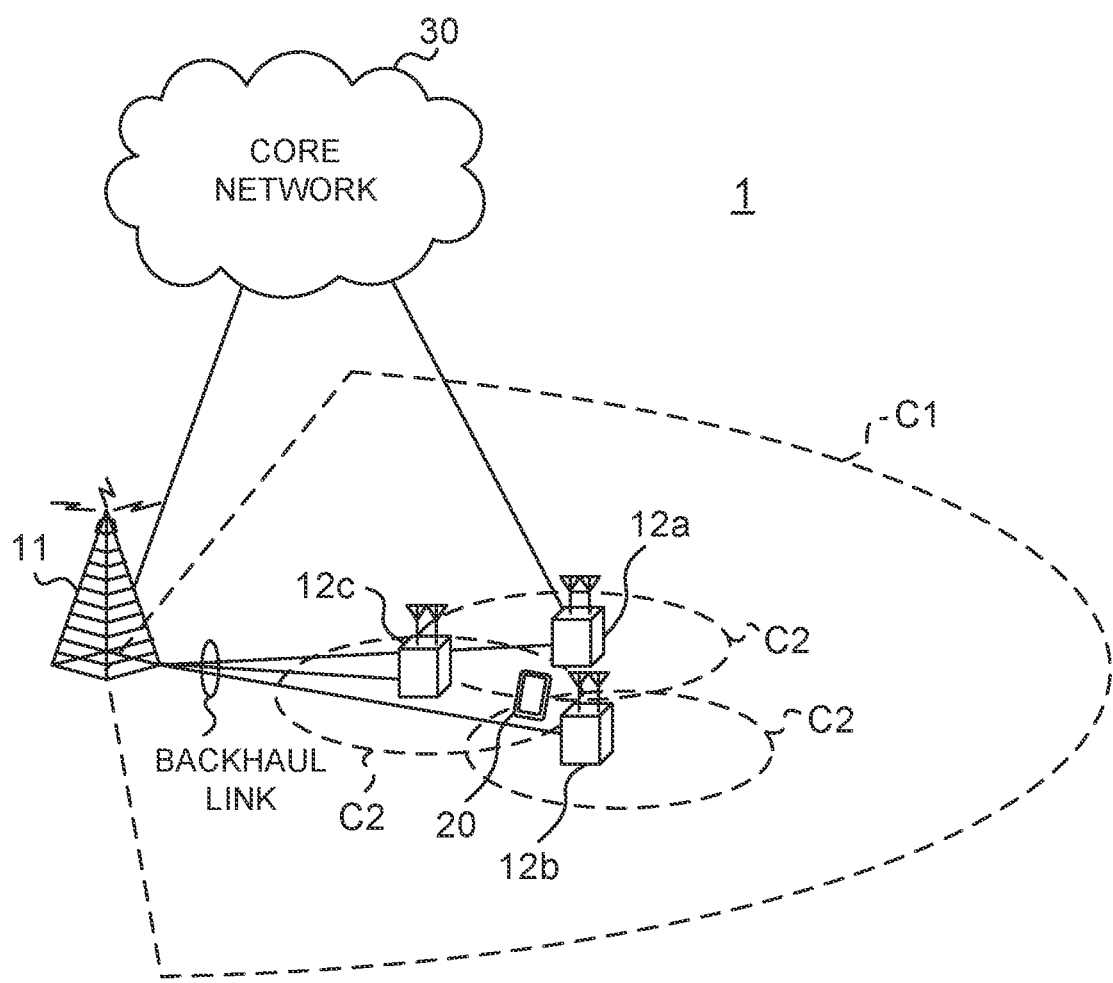
FIG. 10 is a diagram to show an example of a schematic structure of a radio communication system according to one embodiment.

FIG. 10 is a diagram to show an example of a schematic structure of the radio communication system according to one embodiment. A radio communication system 1 may be a system implementing a communication using long term evolution (LTE), 5th generation mobile communication system new radio (5G NR), or the like, the specifications of which have been drafted by third generation partnership project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the common public radio interface (CPRI), and the X2 interface) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 11:
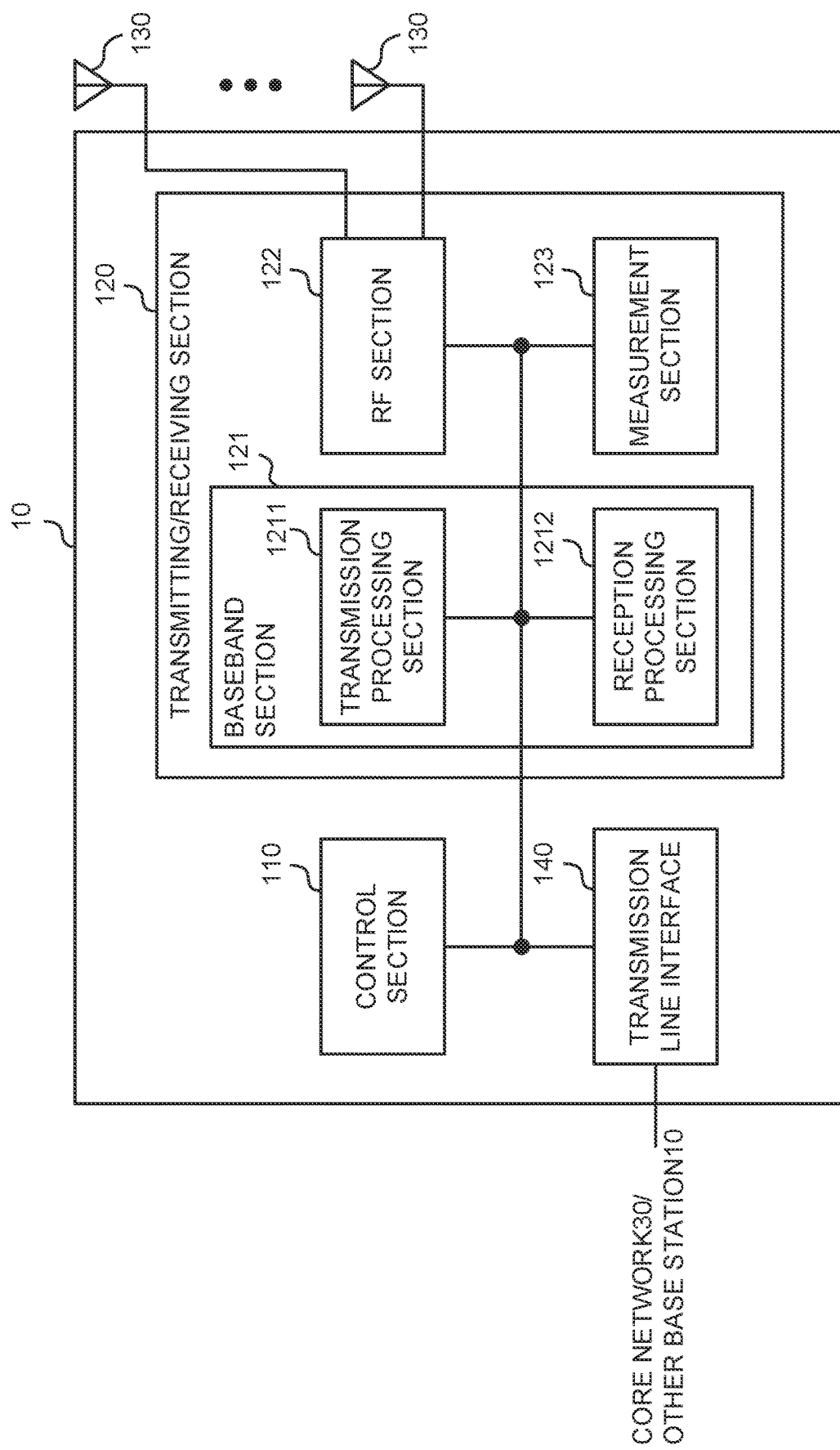
FIG. 11 is a diagram to show an example of a structure of a base station according to one embodiment.

FIG. 11 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam foaming (for example, precoding), analog beam foaming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit a plurality of spatial settings with respect to a resource of an uplink or a downlink. In the case where at least one of a physical uplink shared channel (PUSCH) and the resource satisfies a condition, the control section 110 may control reception of the PUSCH that is transmitted by using at least one of the plurality of spatial settings.

The transmitting/receiving section 120 may transmit a plurality of quasi-co-location (QCL) parameters with respect to a control resource set (CORESET). In the case where at least one of a physical uplink control channel (PUCCH) and the CORESET satisfies the condition, the control section 110 may control reception of the PUCCH that is transmitted by using at least one of the plurality of QCL parameters.

The transmitting/receiving section 120 may transmit a plurality of quasi-co-location (QCL) parameters with respect to a control resource set (CORESET). In the case where at least one of a physical downlink shared channel (PDSCH) and the CORESET satisfies the condition, the control section 110 may control reception of the PDSCH that is transmitted by using at least one of the plurality of QCL parameters.

(User Terminal)

Figure 12:
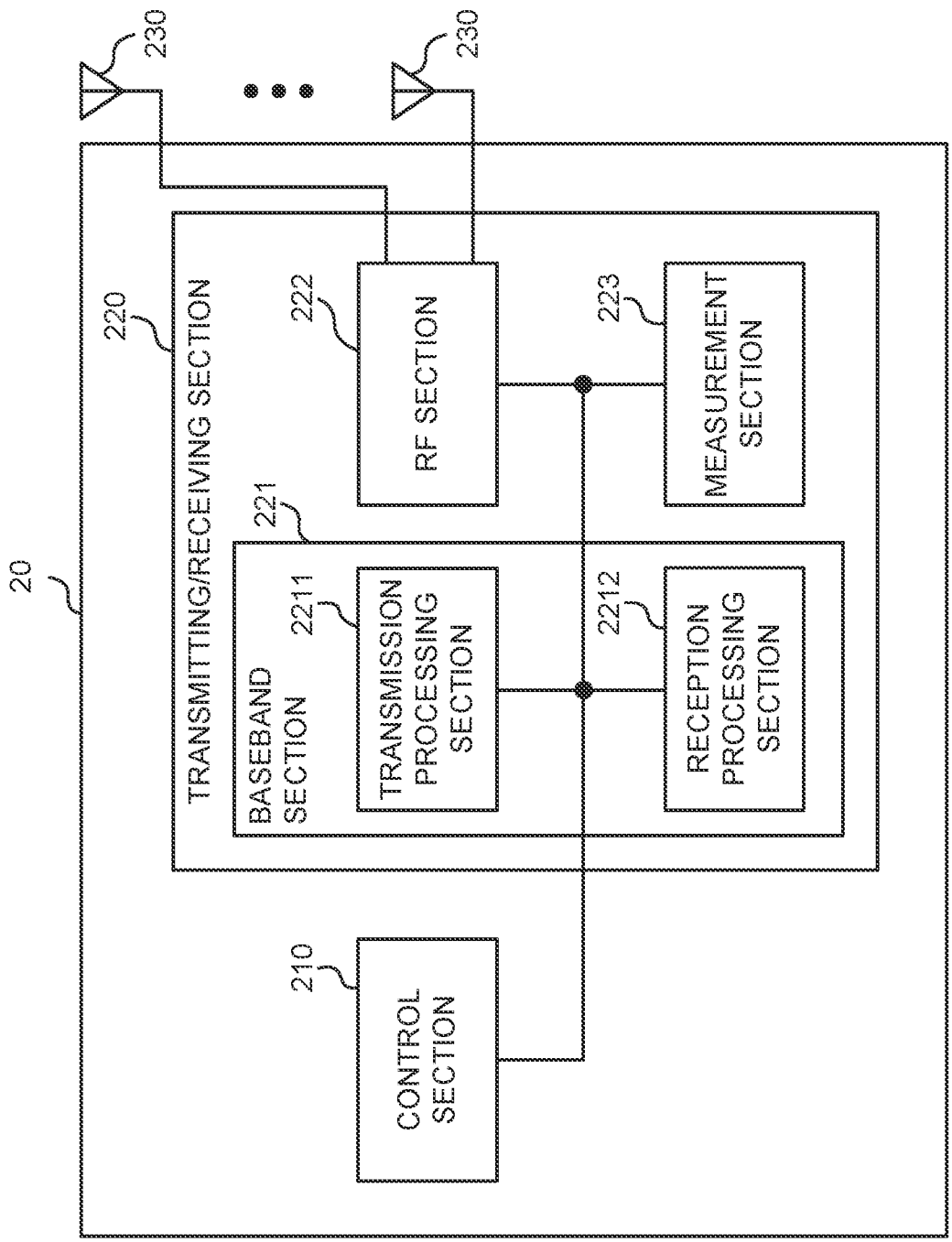
FIG. 12 is a diagram to show an example of a structure of a user terminal according to one embodiment.

FIG. 12 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam foaming (for example, precoding), analog beam foaming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

The transmitting/receiving section 220 may receive a plurality of spatial settings with respect to a resource of an uplink or a downlink. In the case where at least one of a physical uplink shared channel (PUSCH) and the resource satisfies the condition, the control section 210 may use at least one of the plurality of spatial settings, in at least one spatial relation of the PUSCH.

The resource may be one of a physical uplink control channel (PUCCH) resource and a control resource set (CORESET).

In the case where a pool index value of "1" is not configured to any CORESET, each code point of a transmission configuration indication (TCI) field is not mapped to two TCI states, and the PUSCH satisfies the condition, the control section 210 may use one of the plurality of spatial settings, in one spatial relation of the PUSCH.

In the case where a pool index value of "1" is configured to at least one CORESET or at least one code point of a transmission configuration indication (TCI) field is mapped to two TCI states, and the PUSCH satisfies the condition and is repeatedly transmitted, the control section 210 may use the plurality of spatial settings, in each of the plurality of spatial relations of the PUSCH.

The transmitting/receiving section 220 may receive a plurality of quasi-co-location (QCL) parameters with respect to a control resource set (CORESET). In the case where at least one of a physical uplink control channel (PUCCH) and the CORESET satisfies the condition, the control section 210 may use at least one of the plurality of QCL parameters, in at least one spatial relation of the PUCCH.

The CORESET may have a lowest ID.

In the case where a pool index value of "1" is not configured to any CORESET, each code point of a transmission configuration indication (TCI) field is not mapped to two TCI states, and the PUCCH satisfies the condition, the control section 210 may use one of the plurality of QCL parameters, in one spatial relation of the PUCCH.

In the case where a pool index value of "1" is configured to at least one CORESET or at least one code point of a transmission configuration indication (TCI) field is mapped to two TCI states, and the PUCCH satisfies the condition and is repeatedly transmitted, the control section 210 may use the plurality of QCL parameters, in the respective plurality of spatial relations of the PUCCH.

The transmitting/receiving section 220 may receive a plurality of quasi-co-location (QCL) parameters with respect to a control resource set (CORESET). In the case where at least one of a physical downlink shared channel (PDSCH) and the CORESET satisfies the condition, the control section 210 may use at least one of the plurality of QCL parameters, in at least one QCL assumption of the PDSCH.

The CORESET may have a lowest ID.

In the case where a pool index value of "1" is not configured to any CORESET, each code point of a transmission configuration indication (TCI) field is not mapped to two TCI states, and the PDSCH satisfies the condition, the control section 210 may use one of the plurality of QCL parameters, in one QCL assumption of the PDSCH.

In the case where a pool index value of "1" is configured to at least one CORESET or at least one code point of a transmission configuration indication (TCI) field is mapped to two TCI states, and the PDSCH satisfies the condition and is repeatedly transmitted, the control section 210 may use the plurality of QCL parameters, in the respective plurality of QCL assumptions of the PDSCH.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 13:
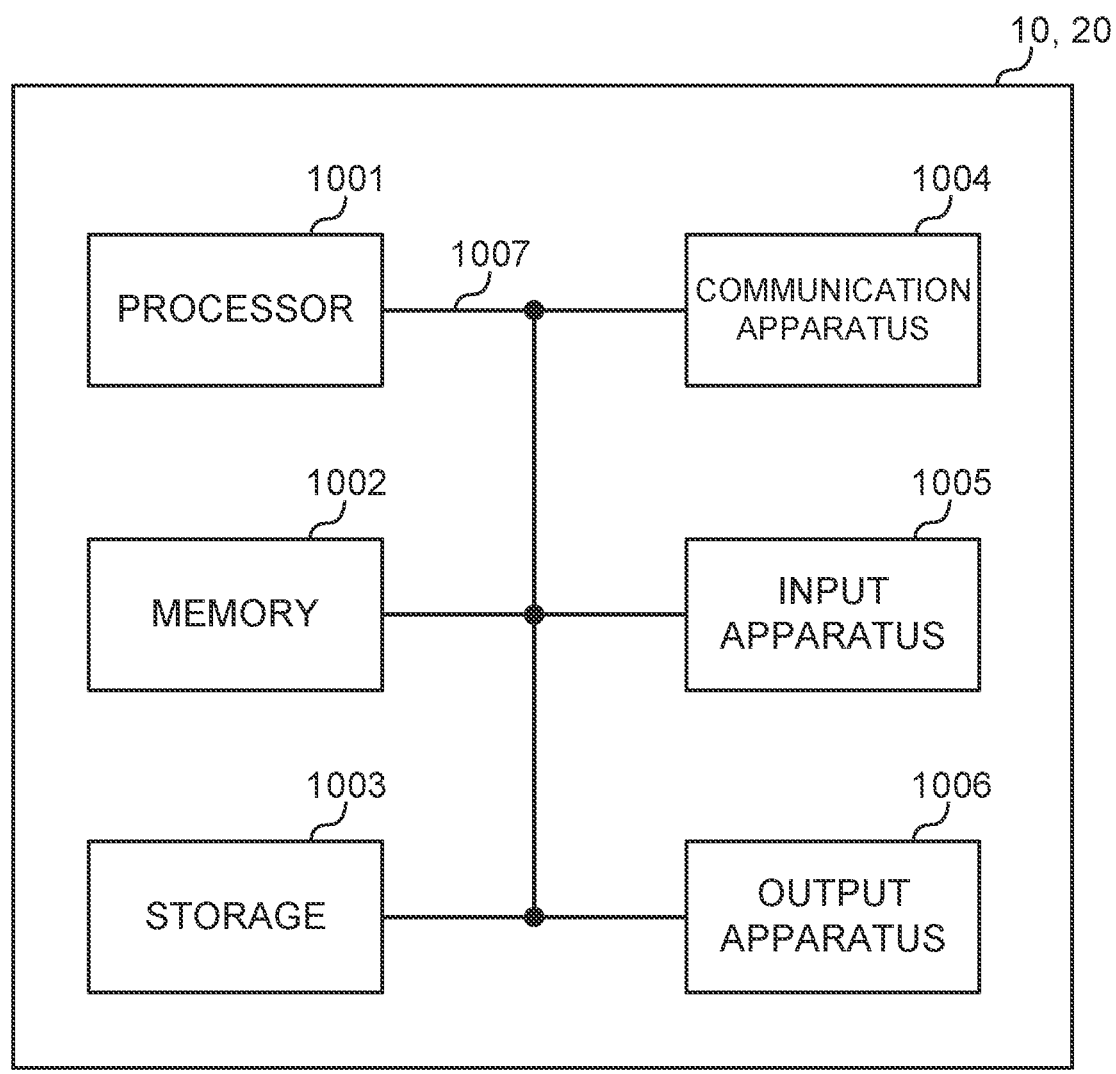
FIG. 13 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 13 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal,"

"wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to long term evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (x is, for example, an integer or a decimal)), future radio access (FRA), new-radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), systems that use other adequate radio communication methods, next-generation systems that are enhanced based on these, and so on. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a transmitter that transmits capability information indicating support for using one of multiple transmission configuration indication (TCI) states indicated for a control resource set (CORESET) as a PUCCH default spatial relation;
    a receiver that receives a Medium Access Control (MAC) Control Element (CE) indicating multiple TCI states for a CORESET; and
    a processor that, when PUCCH spatial relation information is not configured and a pathloss reference signal is not configured, and when the MAC CE indicates multiple TCI states for a CORESET with a lowest ID in an active downlink bandwidth part (DL BWP) of a cell, controls to transmit a PUCCH by using a spatial relation corresponding to a first TCI state of the multiple TCI states as the PUCCH default spatial relation,
    wherein the processor controls, when a time offset between a physical downlink shared channel (PDSCH) scheduled by downlink control information (DCI) without a TCI field in the CORESET and the DCI is equal to or greater than a threshold value, to receive the PDSCH by using at least one of the multiple TCI states that are for the CORESET with the lowest ID in the active DL BWP of the cell, and
    the processor controls, when receiving the PDSCH from a single transmission/reception point (TRP), to receive the PDSCH by using the first TCI state, and controls, when receiving the PDSCH from multi-TRP, to receive the PDSCH by using the multiple TCI states.

2. A radio communication method for a terminal, comprising:
    transmitting capability information indicating support for using one of multiple transmission configuration indication (TCI) states indicated for a control resource set (CORESET) as a PUCCH default spatial relation;
    receiving a Medium Access Control (MAC) Control Element (CE) indicating multiple TCI states for a CORESET;
    when PUCCH spatial relation information is not configured and a pathloss reference signal is not configured, and when the MAC CE indicates multiple TCI states for a CORESET with a lowest ID in an active downlink bandwidth part (DL BWP) of a cell, controlling to transmit a PUCCH by using a spatial relation corresponding to a first TCI state of the multiple TCI states as the PUCCH default spatial relation;
    controlling, when a time offset between a physical downlink shared channel (PDSCH) scheduled by downlink control information (DCI) without a TCI field in the CORESET and the DCI is equal to or greater than a threshold value, to receive the PDSCH by using at least one of the multiple TCI states that are for the CORESET with the lowest ID in the active DL BWP of the cell; and
    controlling, when receiving the PDSCH from a single transmission/reception point (TRP), to receive the PDSCH by using the first TCI state, and controlling, when receiving the PDSCH from multi-TRP, to receive the PDSCH by using the multiple TCI states.

3. A base station comprising:
    a receiver that receives capability information indicating support for using one of multiple transmission configuration indication (TCI) states indicated for a control resource set (CORESET) as a PUCCH default spatial relation;
    a transmitter that transmits a Medium Access Control (MAC) Control Element (CE) indicating multiple TCI states for a CORESET; and
    a processor that, when a terminal is not configured with PUCCH spatial relation information and is not configured with a pathloss reference signal, and when the MAC CE indicates multiple TCI states for a CORESET with a lowest ID in an active downlink bandwidth part (DL BWP) of a cell, controls to receive a PUCCH by using a spatial relation corresponding to a first TCI state of the multiple TCI states as the PUCCH default spatial relation,
    wherein the processor controls, when a time offset between a physical downlink shared channel (PDSCH) scheduled by downlink control information (DCI) without a TCI field in the CORESET and the DCI is equal to or greater than a threshold value, to transmit the PDSCH by using at least one of the multiple TCI states that are for the CORESET with the lowest ID in the active DL BWP of the cell, and
    the processor controls, when transmitting the PDSCH from a single transmission/reception point (TRP), to transmit the PDSCH by using the first TCI state, and controls, when transmitting the PDSCH from multi-TRP, to transmit the PDSCH by using the multiple TCI states.

4. A system comprising a terminal and a base station, wherein
    the terminal comprises:
        a transmitter that transmits capability information indicating support for using one of multiple transmission configuration indication (TCI) states indicated for a control resource set (CORESET) as a PUCCH default spatial relation;
        a receiver that receives a Medium Access Control (MAC) Control Element (CE) indicating multiple TCI states for a CORESET; and a processor that, when PUCCH spatial relation information is not configured and a pathloss reference signal is not configured, and when the MAC CE indicates multiple TCI states for a CORESET with a lowest ID in an active downlink bandwidth part (DL BWP) of a cell, controls to transmit a PUCCH by using a spatial relation corresponding to a first TCI state of the multiple TCI states as the PUCCH default spatial relation, wherein the processor controls, when a time offset between a physical downlink shared channel (PDSCH) scheduled by downlink control information (DCI) without a TCI field in the CORESET and the DCI is equal to or greater than a threshold value, to receive the PDSCH by using at least one of the multiple TCI states that are for the CORESET with the lowest ID in the active DL BWP of the cell, and the processor controls, when receiving the PDSCH from a single transmission/reception point (TRP), to receive the PDSCH by using the first TCI state, and controls, when receiving the PDSCH from multi-TRP, to receive the PDSCH by using the multiple TCI states, and the base station comprises:
a transmitter that transmits the MAC CE.

* * * * *